US005696196A

United States Patent [19]

DiLeo

[11] Patent Number: 5,696,196
[45] Date of Patent: Dec. 9, 1997

[54] EMI/RFI-SHIELDING COATING

[75] Inventor: Derek A. DiLeo, Lafayette, Ind.

[73] Assignee: Egyptian Lacquer Mfg. Co., Lafayette, Ind.

[21] Appl. No.: 529,090

[22] Filed: Sep. 15, 1995

[51] Int. Cl.$^6$ .............. C08J 5/10; C08K 3/34; C08L 33/08

[52] U.S. Cl. .............. 524/445; 524/377; 524/442; 524/446; 524/435; 524/440

[58] Field of Search .............. 524/377, 445, 524/442, 446, 434, 435, 439, 440; 523/137

[56] References Cited

U.S. PATENT DOCUMENTS

| | | | |
|---|---|---|---|
| 3,586,478 | 6/1971 | Neumann | 23/111 |
| 4,305,847 | 12/1981 | Stoetzer et al. | 252/512 |
| 4,382,981 | 5/1983 | Stoetzer et al. | 427/105 |
| 4,517,118 | 5/1985 | Stoetzer | 252/513 |
| 4,518,524 | 5/1985 | Stoetzer | 252/514 |
| 4,652,465 | 3/1987 | Koto et al. | 427/216 |
| 4,716,081 | 12/1987 | Ehrreich | 428/403 |
| 4,739,003 | 4/1988 | Barr et al. | 524/446 |
| 4,826,631 | 5/1989 | Sullivan | 252/512 |
| 4,950,423 | 8/1990 | Sullivan | 252/512 |
| 4,978,708 | 12/1990 | Fowler et al. | 524/507 |
| 5,011,881 | 4/1991 | Fujii et al. | 524/457 |
| 5,118,747 | 6/1992 | Pollart et al. | 524/424 |
| 5,204,401 | 4/1993 | Anderson, Jr. et al. | 524/441 |
| 5,240,777 | 8/1993 | Wacher | 428/454 |
| 5,252,632 | 10/1993 | Savin | 523/137 |

*Primary Examiner*—Vasu Jagannathan
*Assistant Examiner*—U. K. Rajguru
*Attorney, Agent, or Firm*—Woodard, Emhardt, Naughton, Moriarty & McNett

[57] ABSTRACT

A coating composition for shielding plastic against electromagnetic interference (EMI) and radio frequency interference (RFI). The composition includes an aqueous dispersion thermoplastic emulsion, an aqueous urethane dispersion, a glycol-based coalescing solvent, silver-plated copper flakes, conductive clay and one or more defoamers.

10 Claims, No Drawings

EMI/RFI-SHIELDING COATING

FIELD OF THE INVENTION

The present invention relates generally to aqueous coating compositions, and more particularly to an aqueous, spray-on coating effective for imparting electromagnetic interference- and radio frequency interference-shielding properties to molded plastics.

BACKGROUND TO THE INVENTION

The need to shield electronic components from electromagnetic interference ("EMI") and radio frequency interference ("RFI") is well known. While traditional metal cabinets provide an effective shield against this interference, plastic housings permit EMI and RFI waves to pass through. Sensitive electrical components must therefore be housed in metal housings or the plastic housing must be coated with a thin layer of metal to shield against interference.

A variety of methods are known for coating a thin layer of metal onto plastics to make them shield against EMI and/or RFI. One such method is plastic plating, although that method has proven to be expensive, environmentally undesirable, and inconsistent. Vacuum metallizing is another alternative, but that method is unsuitable for volume production of electronic enclosures. The incorporation of metallic fiber into the plastic itself is another method with some promise, but that method remains experimental and expensive and unavailable for widespread use.

The most preferred method of coating metal onto plastic is by spray painting. In particular, spray paints with metal particles (including, e.g., metal powders and flakes) suspended in the paint may be advantageously used. The metal particles are commonly nickel or copper, although silver or some other electrically conductive metal may be used.

Nickel-based EMI-shielding and RFI-shielding coatings were the first to be developed. Although those coatings are relatively inexpensive to make and use, their use has diminished in recent years due to environmental concerns regarding both the nickel itself and the solvents which must be used in those compositions.

Copper-based EMI-shielding and RFI-shielding coatings have been developed to address some of the problems associated with nickel-based coatings. Copper-based coatings are somewhat more expensive than nickel-based coatings, but higher conductivity may be obtained therewith. Either nickel- or copper-based coatings may be prepared with an aqueous carrier so that a low volatile organic content (VOC) may be obtained and certain environmental considerations may be mitigated. However, known copper-based coatings require caustic strippers, are very unstable (they oxidize in the can), and typically provide a poor suspension and poor color flow, etc.

A need therefore exists for an aqueous-based EMI-shielding and RFI-shielding coating composition with good strippability, stability, suspension, color flow, etc. The present invention addresses that need.

SUMMARY OF THE INVENTION

In one aspect of the invention there is provided an aqueous coating composition for shielding plastics against electromagnetic interference and radio frequency interference. The coating composition preferably includes:

a) between about 7.0% and about 65.0% by weight of a thermoplastic water-soluble emulsion;

b) between about 1.5% and about 10.0% by weight of an aqueous urethane dispersion;

c) between about 2.5% and about 16.0% by weight of a glycol coalescing solvent;

d) between about 0.1% and about 5.0% by weight of a conductive clay;

e) particles of a conductive metal selected from the group consisting of copper, silver, nickel and gold, or mixtures thereof;

f) an appropriate amount of a defoamer; and g) water.

One object of the present invention is to provide a coating composition which may be sprayed onto plastic to provide EMI- and RFI-shielding properties.

Further objects and advantages of the present invention will be apparent from the following description.

DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As previously indicated, the present invention is an aqueous, conductive, coating composition. The composition provides excellent film properties, including conductivity, adhesion, flexibility, environmental resistance, stability, anti-settling properties, strippability, mar-resistance, sag resistance, and film hardness during use.

In one embodiment the coating composition comprises an aqueous dispersion thermoplastic emulsion, an aqueous urethane dispersion, a small amount of a glycol-based coalescing solvent, silver plated copper flakes, conductive clay and a defoamer.

The thermoplastic an aqueous dispersion emulsion may be an alkyd, epoxy, polyester or acrylic copolymer emulsion. Preferred emulsions include acrylics and modified acrylics, with styrenated acrylic emulsions being most preferred.

The aqueous urethane dispersion may be an aliphatic or aromatic dispersion. In other aspects of the invention the urethane dispersion may contain polyurethane, acrylic, polyester or vinyl resin polymers.

Glycol coalescing solvents are preferably used to promote film formation, to develop sufficient film integrity so that consistent film development is independent of atmospheric conditions, and to allow for variations in application equipment. Typical suitable glycol type coalescing solvents include: Glycol Ether EB, Butyl Cellosolve, 2-Butoxyethanol (2-BE), Ethylene Glycol Monobutyl Ether (EGBE), Diethylene Glycol Monobutyl Ether (Glycol Ether DB), Butoxydiethylene Glycol, Diethylene Glycol N-butyl Ether, Butyl Di-Glycol, Butyl Carbitol, (Glycol Ether PB) Propylene Glycol Monobutyl Ether, (Glycol Ether EP) Ethylene Glycol Monopropyl Ether, 2-Propoxyethanel, (Glycol Ether PM) Propylene Glycol Monomethyl Ether, Propylene Glycol and Ethylene Glycol. These or equivalent solvents may be used singularly or in combination.

Any conductive metal may be used in the invention. Preferably the conductive metal includes copper, gold, nickel or silver, or alloys thereof. In the most preferred embodiments silver-plated copper metal flakes are used.

The average particle size of the metal can vary over a wide range, but is preferably in the range of from about 5 microns to about 75 microns. Most preferably, the metal is provided as flakes of about 25 microns to about 60 microns. If the mean particle size is less than about 5 microns the electrical properties may be adversely affected. In particular, if the metal particles are too fine, the resistivity of the composition may be too high. If the average particle size is greater than about 75 microns, the composition will not lend itself to thin film applications. In those cases the composition will have a coarse and rough appearance at thinner films and the exposed metal will have a greater risk for abrasion.

Conductive clay is included to orient the metal flakes in a horizontal position ensuring complete metal to metal contact. This results in an increased conductivity as well as a smooth thin film. Also, the clay reduces the tendency for metal settling within a container. This is vital to ensure that a homogenous mix is being delivered to a part during the coating process. Finally, the clay allows for film building in areas which require the composition to be applied to a vertical surface.

Other minor conventional components may be added to the conductive composition such as, but not limited to, defoaming agents, silicones, or waxes. Defoaming agents (defoamers) are preferably used in an amount of between about 0.02% and about 2.0%, by weight, of the composition.

The viscosity of the composition is ready for use with conventional spray equipment, but may be modified for other applications. The normal range is 20±5"#3 Zahn Cup.

The pH is preferably maintained in the range of about 7.0 to about 9.0. Most preferably a pH of about 7.5 to about 8.8 is maintained.

The compositions may be applied by a variety of spray techniques. Conventional or HVLP applications are the most commonly used techniques.

Once the conductive film coating is applied to a substrate, it is cured at room temperature for seven days, or force cured in an oven with the temperature set from 125° F.–400° F. for a time sufficient enough to provide for an accelerated cure and promote good adhesion to a substrate, without distorting the substrate.

The coating may be applied to any conventional rigid or moderately flexible substrate. In some preferred embodiments the substrate is a plastic polymer, most preferably a thermoplastic polymer, such as an acrylic, a polyester, a polycarbonate, a polystyrene, a polyvinyl chloride, an acrylonitrile-butadiene-styrene ("ABS"), a structural molded compound ("SMC") or a polyphenylene oxide ("PPO"), or blends those or similar polymers such as a blend of ABS and polycarbonate. As is known to the art, some substrates may have to be pretreated or precoated before applying a coating composition.

Reference will now be made to specific examples using the processes described above. It is to be understood that the examples are provided to more completely describe preferred embodiments, and that no limitation to the scope of the invention is intended thereby.

EXAMPLE 1

Preparation of an aqueous thin conductive film-forming composition using a copper plated silver flake.

| (Composition-Components) | Weight in parts per 100/wt. |
|---|---|
| Weigh in a container: | |
| acrylic emulsion[1] | 22.31 |
| defoamer[2] | .22 |
| aqueous urethane dispersion[3] | 3.72 |
| Pre-mix and add slowly to high speed vortex: | |
| ethylene glycol monobutyl ether[4] | 3.72 |
| diethylene glycol monobutyl ether[5] | 1.73 |
| Water | 7.89 |
| Add to above mix: | |
| Water | 22.57 |
| Pre-mix under agitation on a side mix for 30 minutes before adding back to above composition: | |
| Water | 9.21 |
| Conductive clay | 1.02 |
| Sift into vortex while mixing the above composition: | |
| Copper silver flake | 27.40 |

[1] e.g., Neocryl A-639
[2] e.g., Deefo 806-102
[3] e.g., Neorez R-966
[4] e.g., Butyl Cellosolve
[5] e.g., Butyl Carbitol
Add to defoam:

| | |
|---|---|
| BYK 020 defoamer | .21 |
| The properties of the above composition are as follows: | |
| Weight/gallon | 11.39 |
| % Weight solids | 43.34 |
| % Volume solids | 21.61 |
| VOC | 2.29 |
| Coverage | 347 Sq. Ft. @ 1.0 mil no loss |
| Viscosity | 20 sec. #3 Zahn |
| pH | 7.8 |
| Conductivity | 0.35 OHMS/Sq @ 1.0 mil |
| Adhesion | ASTM 5B rating over tested substrates |

EXAMPLE 2

Preparation of another aqueous thin conductive film forming composition using a copper plated silver flake.

| Component | Parts per 100 |
|---|---|
| styrenated acrylic emulsion[6] | 22.31 |
| defoamer[7] | .22 |
| aqueous urethane dispersion[8] | 3.72 |
| Pre-mix and add slowly to high speed vortex: | |
| Propylene glycol monobutyl ether | 3.72 |
| Propylene glycol monomethyl ether | 1.73 |
| Water | 7.89 |
| Add to above mix: | |
| Water | 22.57 |

[6] e.g., Neocryl A-639
[7] e.g., Deefo 806-102
[8] e.g., Neorez R-966
Pre-mix under agitation on a side mix for 30 minutes before adding back to above composition:

| | |
|---|---|
| water | 9.21 |

-continued

| | |
|---|---|
| conductive clay | 1.02 |
| Sift into vortex while mixing above composition: | |
| Copper silver flake | 27.40 |
| Add to defoam: | |
| BYK 020 | .21 |
| The properties for the above composition are as follows: | |
| Weight/gallon | 11.39 |
| % weight solids | 43.34 |
| % volume solids | 21.61 |
| VOC | 2.29 |
| Coverage | 347 sq/ft @ 1.0 mil no loss |
| pH | 7.8 |
| Conductivity | Less than 0.5 ohms/sq @ 1.0 mil |
| Adhesion | ASTM 5B rating over tested substrates |

EXAMPLE 3

| Composition-Components | Weight in Parts per 100/wt. |
|---|---|
| Weigh into a container: | |
| acrylic emulsion[9] | 22.31 |
| defoamer[10] | .22 |
| aqueous urethane dispersion[11] | 3.72 |
| Pre-mix and add slowly to high speed vortex: | |
| Butyl Cellosolve | 3.72 |
| Butyl Carbitol | 1.73 |
| Water | 8.63 |

[9] e.g., Joncryl 537
[10] e.g., DEEFO 806-102
[11] e.g., Bayhdrol TPLS-2033

| | |
|---|---|
| Add to above mix: | |
| Water | 22.57 |
| Pre-mix under agitation on a side mix for 30 minutes before adding back to above composition: | |
| Water | 9.21 |
| conductive clay | 1.02 |
| Sift into the vortex while mixing the above composition: | |
| Copper Silver Flake | 27.40 |
| Add to de-foam: | |
| BYK 020 | .21 |
| The properties of the above composition are as follows: | |
| Weight/Gallon | 11.40 ± 0.2 |
| % Weight Solids | 43.00 ± 2.0 |
| % Volume Solids | 21.00 ± 2.0 |
| VOC | 2.29 |
| Coverage | 347 Sq. Ft. @ 1.0 mil. - no loss |
| Viscosity | 15-20" #3 Zahn |
| pH | 8.5-8.8 |
| Conductivity | Less than 0.5 ohms/Sq. @ 1.0 mil. |
| Adhesion | ASTM 5B rating over tested substrates |

The inventive compositions are useful as highly conductive coatings which can be applied in thin films through a spray application. The effectiveness of the conductive film allows the composition to be useful at minimal film thickness, particularly in the range of 0.5 mils to 2.0 mils. This is a significant advantage over prior art compositions since irregular or unusual part geometries may make it difficult to achieve thick films in certain areas. One specific examples of use of the coating is to shield plastic devices which contain electrical circuits or internal computer components that may be subjected to and require electromagnetic compatibility.

It is also to be appreciated that the inventive coating is easily stripped from the substrate. This feature is unique to this group of coatings and provide a significant benefit since the coating can be removed from the substrate at any point in the product's life.

In particular, using a combination of provided chemicals the coating is easily lifted from a part in strips or sheets, rather than dissolving into a solution. The metal is accordingly held within the skin of the coating, rather than dissolving, preventing the metal from interacting with manufacturing equipment or chemicals in the washers or stripping solutions.

In addition, as the product is stripped in sheets, the manufacturer can easily collect the waste products by filtering through a relatively coarse filter. This further allows him to reuse the stripper or save it for a future operation. Any collected product can then be dried and disposed of as a solid waste.

While the invention has been illustrated and described in detail in the drawing and foregoing description, the same is to be considered as illustrative and not restrictive in character, it being understood that only the preferred embodiment has been shown and described and that all changes and modifications that come within the spirit of the invention are desired to be protected.

What is claimed is:

1. A conductive coating, comprising:
   a) between about 7.0% and about 65.0% by weight of a thermoplastic aqueous dispersion;
   b) between about 1.5% and about 10.0% by weight of an aqueous urethane dispersion;
   c) between about 2.5% and about 16.0% by weight of a glycol coalescing solvent;
   d) between about 0.1% and about 5.0% by weight of a conductive clay;
   e) particles of a conductive metal selected from the group consisting of copper, silver, nickel and gold, and mixtures thereof;
   f) one or more defoaming agents; and
   g) water.

2. The composition of claim 1 wherein said aqueous dispersion thermoplastic emulsion is an acrylic emulsion.

3. The composition of claim 2 wherein said acrylic emulsion is a modified acrylic emulsion.

4. The composition of claim 3 wherein said acrylic emulsion is a styrenated acrylic emulsion.

5. The composition of claim 1 wherein said aqueous dispersion urethane dispersion includes a member selected from the group consisting of polyurethane, polyester, acrylic resin and vinyl resin.

6. The composition of claim 1 wherein said particles of conductive metal are particles of silver-plated copper.

7. The composition of claim 6 wherein said particles of silver-plated copper are provided as flakes of from 5 microns to 75 microns.

8. The composition of claim 7 wherein said particles of silver-plated copper are provided as flakes of from 25 microns to 60 microns.

9. The composition of claim 1 wherein between about 0.02% and about 2.0% (by weight) defoamer is included in the composition.

10. The composition of claim 1 wherein the composition has a pH of between about 7.0 to about 9.0.

* * * * *